United States Patent [19]

Stewart et al.

[11] Patent Number: 4,757,406
[45] Date of Patent: Jul. 12, 1988

[54] HIGH CAPACITY DISK DRIVE

[75] Inventors: Alec D. Stewart, Cardenden; David Shanks, Freuchie, both of Scotland

[73] Assignee: Rodime PLC, Fife, Scotland

[21] Appl. No.: 775,802

[22] Filed: Sep. 13, 1985

[51] Int. Cl.⁴ .............................................. G11B 5/09
[52] U.S. Cl. ........................................ 360/51; 360/49; 360/50
[58] Field of Search ................... 360/48, 49, 50, 39, 360/40, 51

[56] References Cited

U.S. PATENT DOCUMENTS

| | | | |
|---|---|---|---|
| 4,345,280 | 8/1982 | Blagaila et al. | 360/53 |
| 4,366,512 | 12/1982 | Janak et al. | 360/48 |
| 4,484,176 | 11/1984 | Fitzpatrick | 360/40 |
| 4,554,598 | 11/1985 | Tarbox et al. | 360/48 |
| 4,568,988 | 2/1986 | McGinlay | 360/77 |

*Primary Examiner*—Vincent P. Canney
*Attorney, Agent, or Firm*—Dickstein, Shapiro & Morin

[57] ABSTRACT

A method of and apparatus for generating and protecting hard sector pulses using the read/write heads of the disk drive without using any external transducers is disclosed. Each track of the disk is pre-formatted with a pattern of a burst of data followed by a short erased gap repeated around the track once per sector. The data bursts are converted to digital pulses which are used to trigger a monostable as long as the read/write heads are positioned over data. The lack of an output signal from the monostable is used to detect the erased gaps. At the end of the erased gap, a sector marker pulse is generated. Various protection signals are also generated. The high capacity hard sectored computer disk drive system disclosed herein utilizes a hard disk which rotates at a speed of approximately 2750 r.p.m. The data received from the host computer for storage on the hard disk is converted to 2,7 RLL coding prior to being written onto the disk. The disk drive system has a formatted data storage capacity in excess of 10 megabytes per disk, using both sides of the disk.

32 Claims, 8 Drawing Sheets

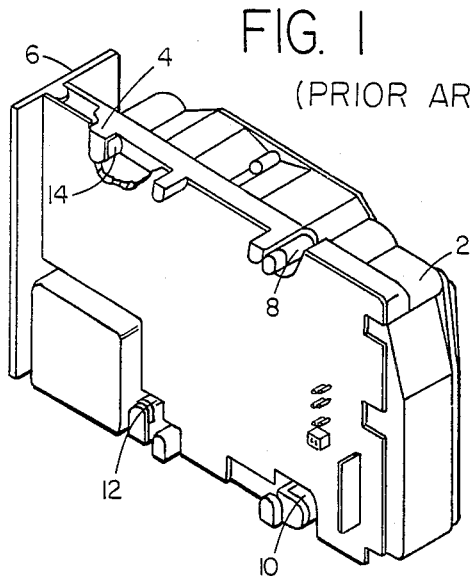
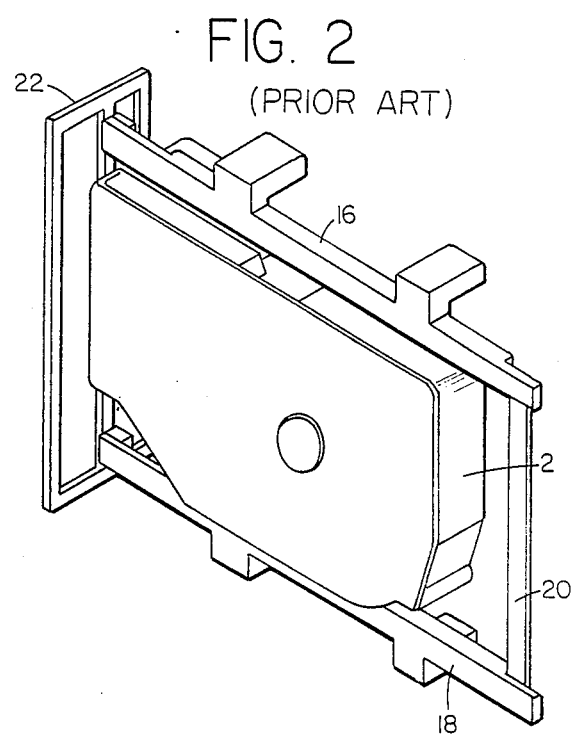
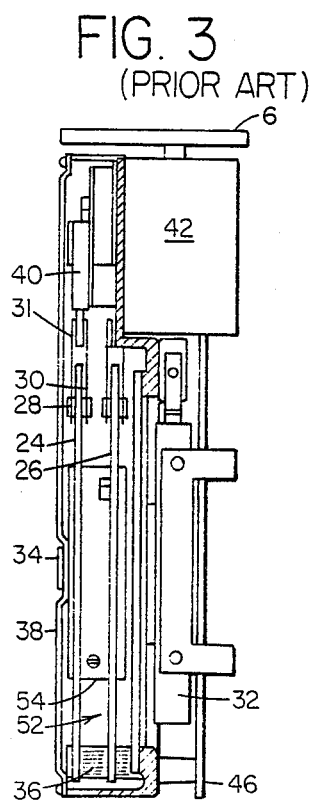
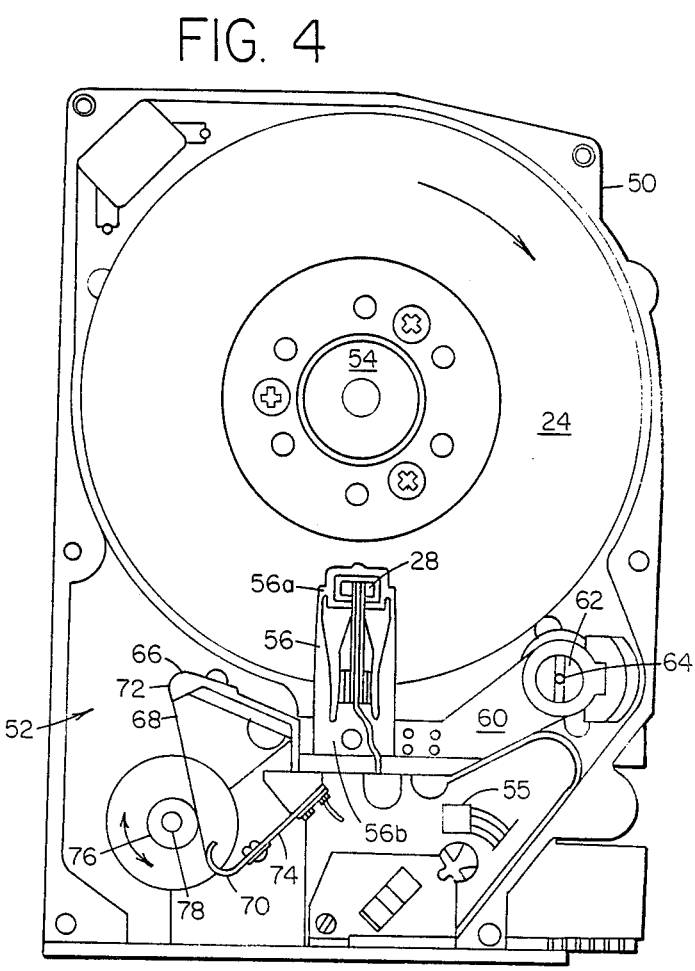
FIG. 1 (PRIOR ART)
FIG. 2 (PRIOR ART)
FIG. 3 (PRIOR ART)
FIG. 4

HIGH CAPACITY DISK DRIVE

CROSS-REFERENCE TO RELATED APPLICATIONS

The assignee of the instant application is also the assignee of an application filed Feb. 22, 1984, entitled "Micro Hard-Disk Drive System," U.S. Pat. Application Ser. No. 582,554, now U.S. Pat. No. 4,568,988, and an application Sept. 6, 1985, entitled "High Capacity Disk Drive," U.S. Pat. Application Ser. No. 773,136. The disclosures of those applications are hereby incorporated by reference.

BACKGROUND OF THE INVENTION

The present invention relates to a micro-hard disk drive system, and in particular, a micro-Winchester high capacity disk drive in which the read/write heads are used to generate and protect a hard sectoring scheme.

With the rapidly expanding development of personal computers, portable personal computers and desk top data processing systems, there has been a demand for increasing the performance of the disk drive systems of such computers. A major development in that direction has been the introduction of small Winchester disk drives as replacements and enhancements to floppy disk drives for program storage. The Winchester disk drive in general provides higher capacities and faster speeds of operation, factors which are important for the effective use of personal computers running advanced software packages.

The types of Winchester disk drives that have been developed in that regard were based upon the use of hard disks of diameter of approximately five and one-quarter inches, also known as mini-Winchester disks. Such so called "five and one-quarter inch" disk drives have generally developed as an "industry standard." Such Winchester disk drive systems can typically store 5-30 Megabytes of information when designed around an open-loop positioning system using a stepper motor capable of supporting up to approximately 360 data tracks per inch. However, advances made by the assignee of the present invention have expanded the storage capacity of the typical five and one-quarter inch disk drive up to 600 tracks per inch using the same basic type of open-loop postioning system. Such a track density had previously been believed unobtainable with stepper motor technology.

With the introduction of portable personal computers, it is clearly a performance advantage to achieve a high degree of software compatibility with the desk top computing systems. In addition, portability demands special requirements on the incorporation of a hard disk system, for example, light weight, low-power consumption and the capability of withstanding harsher shock and vibration conditions. However, software compatibility also demands performance parameters, such as data storage capability comparable to those available on five and one-quarter inch mini-Winchester disk drive systems.

Among the various advances that have been made in the construction and operation of disk drive systems are those developments made by the assignee of the present application, Rodime PLC, which developments are set forth in the following U.S. Patent and Patent applications. The subject matter of such patent and patent applications is hereby incorporated by reference.

U.S. Pat. No. 4,392,095, entitled "Method of and Apparatus for Generating a Unique Index Mark from the Commutation Signal of a D.C. Brushless Motor," discloses a system for providing a unique index mark relative to the computer disk which is required for avoiding errors in addressing a memory location on the disk surface. That index mark is provided by correlating the commutation signal from a d.c. motor with a synchronizing signal present on one or more discrete tracks of the computer disk.

U.S. Pat. Application Ser. No. 332,003, entitled "Read/Write Head Thermal Compensation System," discloses a thermal compensation system used by Rodime PLC in its five and one-quarter inch disk drive system. That thermal compensation system uses different materials with different coefficients of thermal expansion for various components of the positioning mechanism for the read/write head used in the disk drive system. In the operation of that thermal compensation system, in response to a change in temperature, a mispositioning of the read/write head is compensated for by a counter-movement due to the selection of various materials with different coefficients of thermal expansion within the mechanical arrangement.

U.S. Pat. No. 4,538,192, entitled "Ventiliation System for a Computer Disk Drive Hub Assembly," discloses a ventilation system for use in a computer disk drive which enables the disk file data storage capacity to be increased for a given volume of chamber housing the disk and improves the disk drive operating performance.

U.S. Pat. No. 4,489,259, entitled "Method and Apparatus for Controlling a Stepper Motor," discloses a system for minimizing oscillations of the stepper motor for a single step, minimizing the time taken for the stepper motor to move between tracks for multi-track seek operations and reducing the angular hysteresis due to the mechanical and magnetic properties of the stepper motor construction. In controlling the operation of the stepper motor, a microprocessor circuit is adapted to drive the stepper motor in accordance with predetermined programs.

U.S. Pat. No. 4,568,988, entitled "Micro-Hard Disk Drive System," discloses a high-density micro-Winchester hard disk system using a hard disk of approximately three and one-half inches and having digital information stored at a density of approximately 600 concentric tracks per inch, and at a storage density equivalent to at least 5 Megabytes per hard-disk. A stepper motor is designed to increment in steps of 0.9° which causes the read/write head to move from one track to the next adjacent track on the hard disk. For many applications, it has now become advantageous to utilize a high performance three and one-half inch Winchester disk drive having a storage capacity in excess of that achieved in the above-disclosed micro-hard disk drive system, namely in excess of 10 Megabytes. Such increased storage capacity allows the use of more sophisticated programs and the storage of data for use therewith than has been possible heretofore.

Such prior art disk drives have almost exclusively used the "industry standard" ST 506 interface to the host system. That interface has the disadvantage that it defines fundamental operating parameters of the disk drive, such as MFM (modified frequency modulation)

coding, data transfer rate and disk rotational speed, which limit the storage capability of the disk drive.

Although the invention described herein utilizes an open-loop positioning system to achieve cost effectiveness while still attaining a storage capacity in excess of 10 Megabytes, a more expensive closed-loop positioning system could readily be utilized in place of that open-loop positioning system.

Most hard-disk drive systems utilize a system which provides one reference mark or index pulse per revolution so that the user can format each track on the drive into a plurality of sectors. Each of those sectors includes a header which contains information which identifies the sector and track location. That information is read by the drive every time data is read from or written to that sector. Such a scheme of operation is called soft-sectoring. However, soft-sectoring has the disadvantages that it is difficult to implement, requires more hardware and is more expensive than hard-sectoring.

Hard-sectoring, in which the disk drive physically provides a mark for every sector pulse as well as once per revolution of the disk, is less complex and less expensive than soft-sectoring and is desirable for connection to certain computers which may already be designed to use such hard-sectoring techniques.

In prior art systems, the necessary sector and index pulses were produced by means of a transducer and some form of code wheel which was rotated by the drive motor. Typically, such transducers were either optical or electromagnetic. They sensed the revolving wheel and generated a pulse for every sector mark. However, such prior art hard-sectoring systems, although requiring less hardware than soft-sectoring schemes, still require hardware over and above that necessary to operate the drive. In addition, such hard-sectoring systems require alignment of the transducer with the code wheel, and the maintenance of that alignment under operating conditions.

SUMMARY AND OBJECTS OF THE INVENTION

In view of the foregoing, it should be apparent that there still exists a need in the art for a hard-sectoring system for a micro-hard disk drive system having high performance capabilities and which requires little or no additional hardware be added to the drive. It is, therefore, a primary object of this invention to provide such a high capacity micro-hard disk drive system which has particular application for use with both personal and portable personal computers.

A further object of the present invention is to provide an improved high capacity hard sectored hard disk drive system in which the size, weight, sensitivity to vibration, power consumption and heat dissipation are minimized without sacrificing high performance and high storage capabilities, thereby rendering the system particularly advantageous for use in portable computing systems.

Still another object of the present invention is to provide a micro-Winchester disk drive with a positioning system capable of providing performance parameters comparable to those of a five and one-quarter inch Winchester disk drive.

Another object of the present invention is to provide a hard sectored micro-Winchester disk drive system that affords a storage capacity of at least 10 Megabytes per disk.

A still further object of the present invention is to provide a micro-Winchester disk drive system that is electrically compatible with floppy disk drives in its interface to computer systems.

Another object of the present invention is to provide a high capacity micro-hard disk drive system in which the disk housing assembly is secured with a set of anti-vibrational mounts which isolates the housing against vibrational forces.

Another object of the present invention is to provide a micro-Winchester disk drive system in which data is stored at a density of at least 600 tracks per inch.

Still another object of the present invention is to provide a high capacity micro-hard disk drive system having a disk rotational speed of approximately 2750 RPM and which uses 2,7 RLL coding to achieve a formated storage capacity of at least 10 Megabytes per disk.

It is yet another object of the present invention to provide a micro-hard disk drive system having a thermal compensation system which compensates for any misalignment of the read/write head positioning mechanism due to thermal effects.

Briefly described, these and other objects of the present invention result in a high capacity micro-Winchester disk drive system which provides a disk drive system particularly suited to meet the needs of a portable computer system, as well as meeting the needs of a personal computer system. The terminology "micro-Winchester" disk refers to a Winchester disk of 85–100 millimeters in diameter, with the preferred embodiment being approximately 96 millimeters. A Winchester disk of that size can also be referred to as a "3.5 inch" Winchester disk. That high capacity micro-Winchester disk drive system was developed to incorporate the 600 tracks per inch open-loop positioning capability previously developed by the assignee, and utilizes a slower disk rotational speed, an increased flux density and 2,7 RLL (Run Length Lrmited) coding for achieving a storage capacity heretofore unachievable in a micro-Winchester hard disk. Such new disk drive system, by virtue of its small size, vibrational isolation, integral controller and high storage capacity, is ideally suited for use in both personal and portable computer systems.

The high capacity disk drive system of the present invention is constructed for operating micro-Winchester computer disks. This disk drive system provides fast access to a high capacity data storage for use with small business computers, terminals, and microprocessor-based systems, or and many other areas where compact, rugged and lightweight hard disk storage is required. The disk drive system of the present invention normally utilizes either one or two hard disks such as Winchester disks, and provides data storage on each disk in excess of 10 Megabytes once the disks are formatted. It should be understood, however, that data is recorded on both sides of each disk.

Each of the hard disks is mounted for rotation within the housing of the hard disk drive system of the present invention. In accordance with the preferred embodiment, each of those hard disks is 96 millimeters in diameter. A transducer, which includes two read/write heads for each disk within the system, one head positioned on each side of the disk, writes digital information on and reads digital information from the hard disk. The disk drive system of the present invention operates such that information is stored on the disk at a density of at least 600 concentric tracks per inch. A positioning mechanism moves the transducer between the tracks on the computer disk for writing information to and reading information from the disk. The heretofore unachievable storage capacity is achieved by the present invention by operating the disk at a rotational speed of approximately 2750 RPM, an increased flux density and by coding the data before it is recorded on the disk using a 2,7 RLL coding technique.

The positioning mechanism of the disk drive system of the present invention is arranged for moving the transducer along a path extending in an approximately radial direction with respect to the hard disk so that the transducer can move between the inner-most and outer-most tracks on the disk. The positioning means moves the transducer along an arcuate path that extends in the radial direction with respect to the disk.

The positioning mechanism of the disk drive system of the present invention includes a stepper motor and a mechanism for operating the stepper motor in full step increments. In the operation of the stepper motor, each step increment is approximately 0.9°. Each step movement of the stepper motor causes the transducer to move from one track to the next adjacent track. Each read/write head of the transducer is arranged on one end of a support arm, or flexure, which extends in a radial direction with respect to the computer disk. A positioning arm is attached to the other end of the support arm. The positioning arm has one end coupled to a pivot shaft for enabling the positioning arm to be pivoted about the axis of the pivot shaft. That pivot shaft is located on one side of the support arm and is spaced away from that arm.

The stepper motor has an output drive shaft for controlling the movement of the positioning arm. A tensioned steel band is coupled to the drive shaft of the stepper motor via a pulley and is also coupled to both the end of the positioning arm on the opposite side of the support arm from the pivot shaft, and to a tensioning spring attached to the positioning arm. The steel band is connected in a pulley arrangement for coupling the drive shaft of the stepper motor to the positioning arm such that rotational movement of the stepper motor causes the positioning arm to pivot about the pivot shaft. The pivoting movement of the positioning arm in turn moves the support arm and the transducer in incremental steps across the tracks of the disks.

The positioning arm is coupled directly to the pivot shaft, which itself is free to rotate by means of a bearing assembly which includes a pair of ball bearings arranged in a back-to-back configuration with a dimensional pre-load of approximately 5 pounds force. The stepper motor that is used for driving the positioning arm is a two-phase bi-polar stepper motor that operates in a full step mode. The tensioned steel band that interconnects the stepper motor to the positioning arm is a band etched from stainless steel with a tensile strength of greater than approximately 250,000 Psi.

In constructing the positioning mechanism of the high capacity disk drive system of the present invention, the materials for each of the components are selected to automatically compensate for any mispositioning between the transducer and a track caused by thermal effects. The positioning mechanism includes a primary thermal loop that, on average, causes the transducer to move inwardly from a track center as temperature rises. A second thermal loop is provided that causes a counter-movement to the movement caused by the primary thermal loop, thereby tending to maintain the transducer on the track centerline.

In order to provide for such thermal compensation of the positioning mechanism in the disk drive system of the present invention, three different classes of material are utilized. The positioning arm is formed of a first material. The disk and housing are formed of a second material. The pivot shaft, head support arm and metal band are formed of a third material. Those first, second and third materials have different co-efficients of thermal expansion. The arrangement, geometry and selection of materials of those parts are such that, in response to a change in temperature, the various components of the positioning system react in such a way that the support arm effectively rotates via the positioning arm and the pivot shaft so as to maintain the transducer substantially at its original track position. Consequently, the positioning system self-compensates for any movement that would be caused by changes in temperature.

The high capacity disk drive system of the present invention includes a housing in which the micro-hard disk, the transducer, the transducer pre-amplifier, and at least a portion of the positioning mechanism are contained. That housing is arranged within a first frame which holds the housing. A set of anti-vibration mounts secures the housing within the frame so as to minimize the transmission of shock or vibration from the frame to the housing. In addition, the frame supporting the housing holding the disk drive system can be arranged within a second larger frame.

In such a situation, the frame for the high capacity micro-Winchester disk drive system of the present invention can be held within a larger frame that would fit within an opening normally designed for use by either a regular five and one-quarter inch disk drive system or a so-called "half-height" five and one-quarter inch disk drive system.

The electronics of the high capacity micro-Winchester disk drive system of the present invention have been developed utilizing LSI circuits with the entire control circuit, except the pre-amplifier, being arranged on a single printed circuit board. Providing electronic functions of the drive on a single printed circuit board whose dimensions do not exceed the overall dimensions of the drive permits full utilization of the anti-vibration mounting systems and thus makes it possible to utilize the high capacity micro-Winchester disk drive of the present invention in portable computer systems. Further, the electronic functions have been implemented, in part, in several integrated circuit chips of different types with the objective of functioning with a minimum use of power. An additional feature in this regard is the location of the pre-amplifier for the read/write heads, which is mounted within the clean chamber as close as possible to the head assembly in order to minimize noise pick-up. That obviously provides for the increased probability of error-free operation during the reading and writing of information from and to the disk.

An additional feature is the use of a microprocessor routine which substantially reduces the power used by the stepper motor when the disk drive is de-selected by the host computer system. That "power-save" capability and low average power consumption are desirable properties of a hard disk drive when used in a portable computer system, since they result in less heat dissipation, thereby minimizing the requirement of the computer system to provide noisy, heavy and bulky air-extraction fans.

The hard sectored disk drive of the present invention achieves the objects set forth above by pre-initializing the disk during its manufacture to contain a pre-determined special pattern of data on each track. Once the disk drive becomes operational, that data is used by the read/write heads of the drive to generate the sector marks and index pulse used by the host computer. In addition, provision is made to prevent such sector marking data from being accidently overwritten or erased by the user and also to ensure that such sector marking data remains precisely defined on the disk and not vary with increased temperatures.

The pattern may consist of a burst of the highest frequency data normally experienced by the read/write heads, followed by a short erased gap. That pattern is repeated around the entire track, once for each sector.

The circuitry used to implement the above-described method of generating and protecting the hard sector pulses uses the pulse detector and write oscillator already present in most Winchester disk drives. The pulse detector converts the analog signal from the read/write heads into a plurality of digital pulses. A retriggerable monostable is triggered using those digital data pulses. During the time the read/write heads are positioned over data, such pulses from the pulse detector will cause the monostable to keep firing. However, when the heads are over an erased gap, there will be no pulses, so that the monostable will time-out after a pre-determined time period, which time is shorter than that of the erased gap.

A counter is utilized to time from one sector mark to the next, in order to protect the next-following erased gap from being overwritten. Decode logic has also been added to the hardware normally contained in a Winchester drive. That logic decodes outputs from the counter and monostable and generates various control signals. The on-board write oscillator is used to clock the counter in order to provide a time reference.

BRIEF DESCRIPTION OF THE DRAWINGS

FIG. 1 is a side perspective view of the housing of the disk drive system of the present invention mounted within its first frame assembly;

FIG. 2 is a side perspective view of the opposite side of the housing from the view of FIG. 1 of the disk drive assembly of the present invention with such housing and first frame being mounted within a second frame assembly;

FIG. 3 is a sectional view of the disk drive system of the present invention;

FIG. 4 is a plan view of the positioning system of the disk drive system of the present invention;

DETAILED DESCRIPTION OF THE PREFERRED EMBODIMENT

Figure 5:
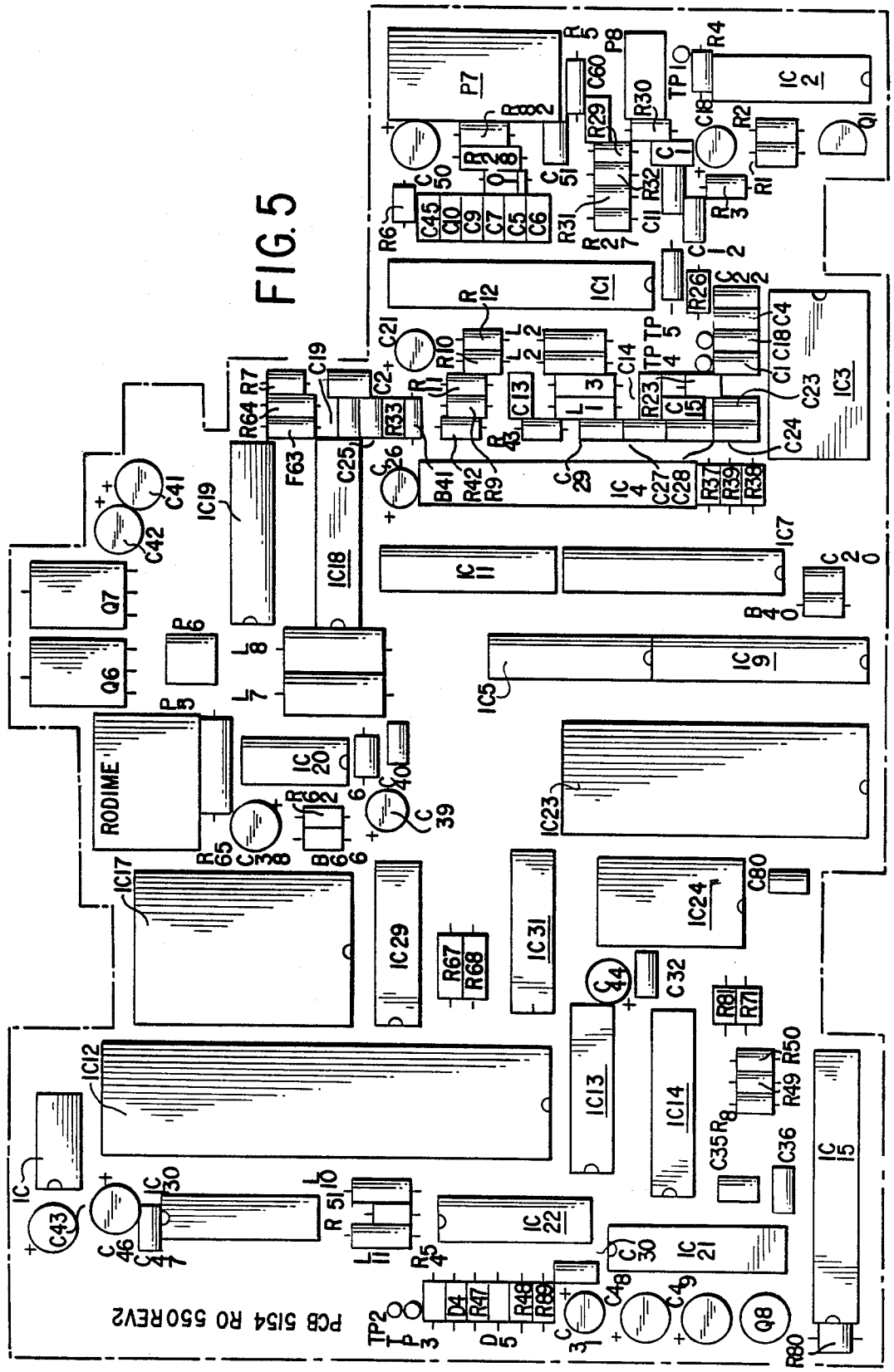
FIG. 5 is a diagram of an embodiment of a printed circuit board for use with the hard sectored disk drive of the present invention.

Referring now in detail to the drawings wherein like parts are designated by like reference numerals throughout, there is illustrated in FIG. 1 a high capacity micro-Winchester disk drive system in accordance with the present invention. The high capacity disk drive includes a housing 2 which is mounted within a frame 4. The frame 4 is attached to a face plate, or facia 6. The face plate 6, together with housing 2 and frame 4, may be slid into a slot provided within a computer for the disk drive system. In order to secure housing 2, and hence the internal operating members of the high capacity disk drive system against vibrational forces, a plurality of anti-vibration mounts 8, 10, 12, and 14 are provided.

It is possible to mount the high capacity micro-Winchester disk drive system of the present invention within a larger opening constructed to receive a 5¼ inch disk drive system. In such an arrangement, as shown in FIG. 2, the housing 2 with the frame 4 is placed inside of a second frame. That second frame is formed by top frame member 16, bottom frame member 18 and a cross bar 20. The second frame is attached to a face plate 22 and to the first frame 4.

The high capacity disk drive system in accordance with the preferred embodiment of the present invention is a microprocessor based device which receives and transmits NRZ data but reads and writes 2-to-7 RLL (Run Length Limited) data, seeking the appropriate track in response to step commands across the disk control interface. The drive is hard sectored and is connected to the host computer via a disk controller internal to the host computer. All actuator control functions are handled by an on-board microprocessor. That microprocessor handles all I/O operations, timing operations and communication with the host controller Typical format schemes with 532 data bytes per sector and 32 sectors per track provide formatted capacities in excess of 20 Megabytes.

A summary of some important performance parameters is given below:

| GENERAL PERFORMANCE | |
|---|---|
| Disks | 2 |
| Heads | 4 |
| Formatted capacity (typical) | |
| Per drive (Megabytes) | 20.7 |
| Per sector (Bytes) | 532 |
| Sectors per track | 32 |
| Cylinders | 305 |
| Transfer rate (MHz) | 7.5 |
| Seek times (ms) | |
| (including settling): | |
| Track to Track | 18 |
| Average | 89.3 |
| Maximum | 180 |
| Average Latency (ms) | 10.9 |
| Flux reversals per inch (max) | 14,700 |
| Tracks per inch | 600 |
| Rotational speed (r.p.m.) | 2,744 + 10%, − 5% r.p.m. |
| Shock: | |
| Operating | .5 g |
| Non-Operating | 40 g (all axes; 10 ms duration) |
| Vibration: | |
| Operating | .5 g 20 Hz to 200 Hz |

-continued
GENERAL PERFORMANCE

| Non-Operating | 2 g 20 Hz to 200 Hz |
| --- | --- |

The microprocessor is responsible for the control of the stepper motor used for head positioning. Fast seek times are achieved by the use of programmed velocity profiles and microstepped damping routines. Automatic thermal compensation has been built into the head positioning mechanism.

A sectional view of the high capacity disk drive of the present invention is shown in FIG. 3. As can be seen therein, two micro-Winchester disks, 24 and 26, are arranged on the hub 54 of a dc motor 32 for rotation within the housing. Magnetic heads 28 and 30 are attached to support arms 31, which in turn are coupled to a stepper motor 42 through a drive band assembly 40 and a positioning arm 41. In addition, positioned within the "clean chamber" 52 is a flat cable flexible circuit 55 which includes the read/write, head select and pre-amplification circuitry for the drive. Such flat cable flexible circuitry serves as the electrical interface between the heads 28 and 30 and the circuit board 46 and may preferably utilize an SSI 117 IC.

High storage capacity is achieved because the disk drive system of the present invention records data on the disks at a rate of 7.5 MHz using 2,7 RLL encoding with the disk rotating at approximately 2,750 revolutions per minute. The recording rate, encoding scheme and rotational speed are a departure from the constraints of the industry standard ST 506 interface, and are possible by having a controller internal to the host computer, as well as a non-ST 506 interface, such as an SCSI host interface. Those parameters, when applied to a micro-Winchester disk drive system in accordance with the preferred embodiment of the present invention, provide a storage capacity greater than 10 Megabytes per disk.

A breather filter 34 is provided on the top cover 38 of the disk housing 50, adjacent to the center of the spindle of the dc motor 32. A recirculating filter 36 is located inside the chamber 52 at one corner in a suitable position in order to filter the flow of air resulting from the pumping effect of the rotating disks 24 and 26 when the disk drive is in operation. The top cover 38 seals the open face of the enclosure by means of a continuous gasket. The electronics board 46 is fixed to the base of the chamber 52, covering the full area (except for the stepper motor 42) of that face of the disk drive. The dc motor is fixed to the base of the chamber and is largely obscured from view by the electronics board 46.

The positioning mechanism is shown in greater detail in FIG. 4. That positioning mechanism is mounted on the base of housing 50 within chamber 52 of the disk drive system. Chamber 52 is formed by chamber housing 50 and top cover 38. Winchester disk 24 is mounted on a hub assembly 54 within the chamber housing 52 so that it is rotated within the chamber by the dc motor 32.

The typical read/write magnetic head 28 is mounted on one end 56a of a flexure 56 which serves as the support arm. The other end 56b of flexure 56 is attached to a positioning arm 60. Flexure 56 is a thin rectangular stainless steel coil. Positioning arm 60 is coupled to a steel pivot shaft 62. That steel shaft 62 is fixed to the inner races of a pair of pre-loaded steel ball bearings (not shown), which in turn are located in the base of housing 50. Pivot shaft 62 rotates about a pivot axis 64.

The side of the positioning arm 60 opposite from the shaft 62 has a curved portion 66. In addition, a steel spring arm 74 is attached to the positioning arm 60. A tensioned steel band 68 is wrapped around and attached to the steel pulley 76 mounted on the drive shaft 78 of the stepper motor. The stepper motor is fixed to the base of the housing 50. The two ends of the steel band, 70 and 72, are attached to arms 74 and 66 respectively.

By appropriately selecting materials of different coefficients of thermal expansion for the various components of the positioning mechanism, it is possible to provide thermal compensation so as to ensure that the read/write heads remain on track irrespective of thermal effects. For such purposes, three different classes of materials are utilized. The first class of material is an aluminum/bronze alloy; the second class of material is stainless steel; and the third class of material is aluminum.

The principal components of the thermal compensation system and their preferred materials are: disk 24 (wrought aluminum); housing 50 (die cast aluminum alloy LM 2); positioning arm 60 (aluminum/bronze alloy); metal band 68 (Sandvik 11 R 51 steel); and flexure support 56 (AISI 301 stainless steel). The dimensions and arrangement of these various components are such that, in response to changes in temperature, the various materials expand or contract in such a way that the support arm (flexure) effectively rotates via the positioning arm and the pivot shaft so as to maintain the typical read/write head substantially at its original track position.

There are two thermal "circuits" effectively controlling the positioning of the read/write head 28 to a track on the disk 24 consisting of a primary thermal circuit and a compensating thermal circuit. The primary thermal circuit operates in chamber 52 and links the track on the disk 24 to the hub 54, to the motor 32, to the base of housing 50, to the bearings for shaft 62, to the shaft 62, to the arm 60, to the flexure 56, and to the read/write head 28. The compensating circuit also operates in chamber 52 and links the arm 60 to the band 68, to the pulley 76, to the stepper motor shaft 7B, to the stepper motor, to the base of housing 50, to the bearings for shaft 62, to shaft 62 and to the arm 60. The primary thermal circuit and the compensating thermal circuit have arm 60, pivot shaft 62, housing 50 and the circulating air in chamber 52 in common.

Whenever there is a temperature change, the primary thermal circuit in chamber 52 results in a misposition of head 28 relative to a track on the disk 24. However, the compensating circuit of the chamber 52 causes the shaft 62 to rotate in such a way as to substantially move the read/write head 28 to its original position relative to the disk. That operation is described more fully below.

A temperature change in chamber 52 causes the read/write head 28 to move relative to a track on the disk 24 because of varying contributions from flexure 56, housing 50 and the positioning arm 60 in the primary thermal circuit. The resulting misposition varies according to track position (proportional to the angle of shaft 62 and the arm 60 relative to the "line" drawn between the center of the hub 54 and the shaft axis 64). As the temperature rises, the head on average mispositions inwardly from the track center line.

The compensating thermal circuit in chamber 52 acts to reduce that misposition to acceptable proportions for all track positions. With temperature changes, the various components of the compensating circuit vary in length relative to each other. A change in geometry causes rotation of the arm 60 about the axis of the shaft 62, thus compensating for the read/write head 28 and the disk 24 misposition over the prescribed track position and temperature range of the disk drive.

The dc motor 32 is a brushless 2-phase external rotor dc motor with integral hub. Commutation is effected by a Hall sensor. A spare Hall sensor is provided in the motor and may be activated in the event that the first Hall element fails. The motor uses preloaded ABEC 7 bearings and is balanced in two planes to better than 0.25 grams centimeters. A ferrofluidic seal is fitted above the top bearing. The disk hub 54 is grounded to the electronics board 46 by the motor shaft and a button contact in order to prevent build-up of static charge on the rotating disks.

The high capacity disk drive of the present invention is not fitted with a separate transducer for generating an index pulse. Instead, the Hall generator in the dc motor is used although it provides two identical pulses per disk revolution. A unique pulse is selected during the power-up sequence by a routine in the microprocessor which detects a pre-recorded data burst. The index/Hall phase which is active when the data burst is detected is thus automatically selected. The disks 24 and 26 are rotated at a speed of 2744 plus 10% or −5%.

The electronics developed for the high capacity micro-Winchester disk drive system of the present invention were designed primarily as large scale integrated circuits (LSI) that are placed on a single printed circuit board (with the exception of the pre-amplification, read/write and head circuitry), as shown in FIG. 5. The use of only a single printed circuit board whose dimensions lie within the outline dimensions of the housing 50 is particularly beneficial in enabling the dual anti-vibrational mounting arrangement of the present invention to be utilized for mounting the high capacity micro-Winchester disk drive system in the space normally provided for a 5¼ inch disk drive system. Consequently, an extremely rugged, low weight, high capacity hard disk drive system is provided for use in a portable computer.

Furthermore, the development of such a single printed circuit board electronic control circuit in the high capacity micro-Winchester disk drive system has enabled the power consumption and dissipation to be significantly reduced. For example, the electronic circuits in the preferred embodiment provide heat dissipation at a rate of between 9 and 13 watts as compared to 25 watts typically dissipated by a 5¼ inch Winchester disk drive system. Thus, the high capacity micro-Winchester disk drive system of the present invention dissipates a relatively small amount of heat into the computer system. That enables a portable computer to utilize either a smaller fan or to entirely eliminate the use of a fan for removing heat from the system.

Figure 7:
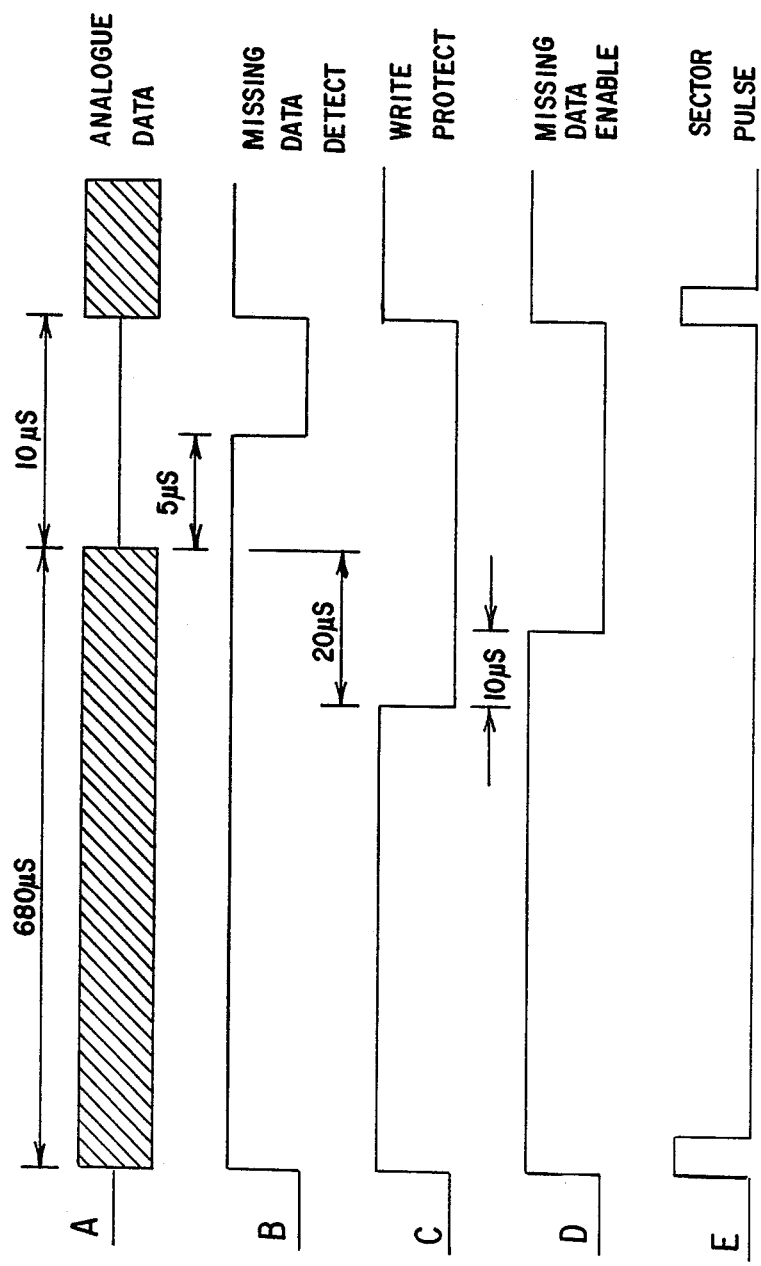
FIGS. 7A-7E are schematic timing diagrams illustrating the derivation of a sector marker pulse from the analog data on the disk and various other protect signals.

A timing diagram showing the derivation of the sector pulses from the analog data written on the hard disk is shown in FIG. 7. During pre-initialization, each of the 32 sectors, 0–31, on each track has an analog data signal of 680 microseconds in length recorded thereon. That data signal may consist of a burst of the highest frequency data normally seen by the heads, which may be 2.5 MHZ for example. An erased portion of 10 microseconds follows that data. The analog signal shown in FIG. 7A is fed to a pulse detector 114, which converts that analog information into digital pulses, once for each flux transition. The pulses generated by the pulse detector 114 are used to fire a retriggerable monostable 120, set to produce a pulse for 5 microseconds when fired. The output of the monostable 120 is shown as FIG. 7B. Thus, the output of the monostable stays high for no more than 5 microseconds, after the end of the data burst is read by the head.

Since the monostable 120 times out 5 microseconds after the end of the 680 microseconds data burst, and no data burst is contained in the erased portion, the next time the monostable is triggered will indicate the end of the erased gap and the beginning of the next data burst or sector. The sector pulses thus produced are shown in FIG. 7E.

A counter 122 is used to time from that sector mark until the end of the next erased portion and, thus, the next sector mark. Various protection signals, shown in FIGS. 7C–7D are also generated in order to protect the 10 microseconds erased gap from being overwritten.

At approximately 20 microseconds before the beginning of the erased gap, a write protect signal, shown in FIG. 7C, is generated. That signal has a duration of approximately 30 microseconds and is used to turn off the write gate of the disk drive in order to prevent accidental overwriting of the erased gap. The write protect signal is anded with the write gate's signal which switches off the write function internal to the disk drive.

About 10 microseconds after the write protect signal is generated, a missing data enable signal, shown in FIG. 7D, is generated. Both the write protect and missing data enable signals are generated from the counter 122. The missing data enable signal effectively gates the missing data section so that during that time only an erase section is detected. Approximately 10 microseconds later, the rising edge of the monostable signal, as shown in FIG. 7B, causes the generation of the next sector mark, which resets the counter and the circuitry starts counting again to find the next sector mark.

By using the method and waveforms discussed above, the present invention looks for erased sections only during a fixed period of time after the previous erased section. Thus, the present invention does not provide a false sector mark because of flaws in the disk or because of times when the recording heads are switched off. The delay between the missing data detect and write protect signals enables the read channel to recover from the use of the write head and to begin generating pulses which the present invention can recognize as data or erased gaps.

Utilizing the system of the present invention, once the sector marks have been identified to the host disk controller, those sector marks indicate where data is to be recorded, as is the general practice. Using the write protect scheme described herein, data will thus be written during the first 680 microseconds of each sector on a track and the erased gap will remain as the last 10 microseconds of each sector. Since the pulse detector will continue to produce digital pulses to fire the monostable during the presence of any data, even after a subsequent cold start up, the host disk controller will still "see" the pre-initialized data, even though that data may have been overwritten with user data.

The operation of the invention is totally transparent to the user. The user's data is recorded during the first 680 microseconds of each sector. If the end of user data is reached before the end of the sector, the normal procedure of filling the sector is utilized until the next sector pulse is detected. Of course, the write protect always functions to switch off the write function during the 10 microseconds erase gap, however, no evidence of that switching-off (and the subsequent switching-on) is conveyed to the user.

The electronic control circuits for the high capacity disk drive system are shown in the schematic diagrams of FIGS. 9-12. Those diagrams are described further below. However, before describing those circuits, reference is made to FIG. 6, which shows the organizational layout of the preferred embodiment of the present invention.

Figure 6:
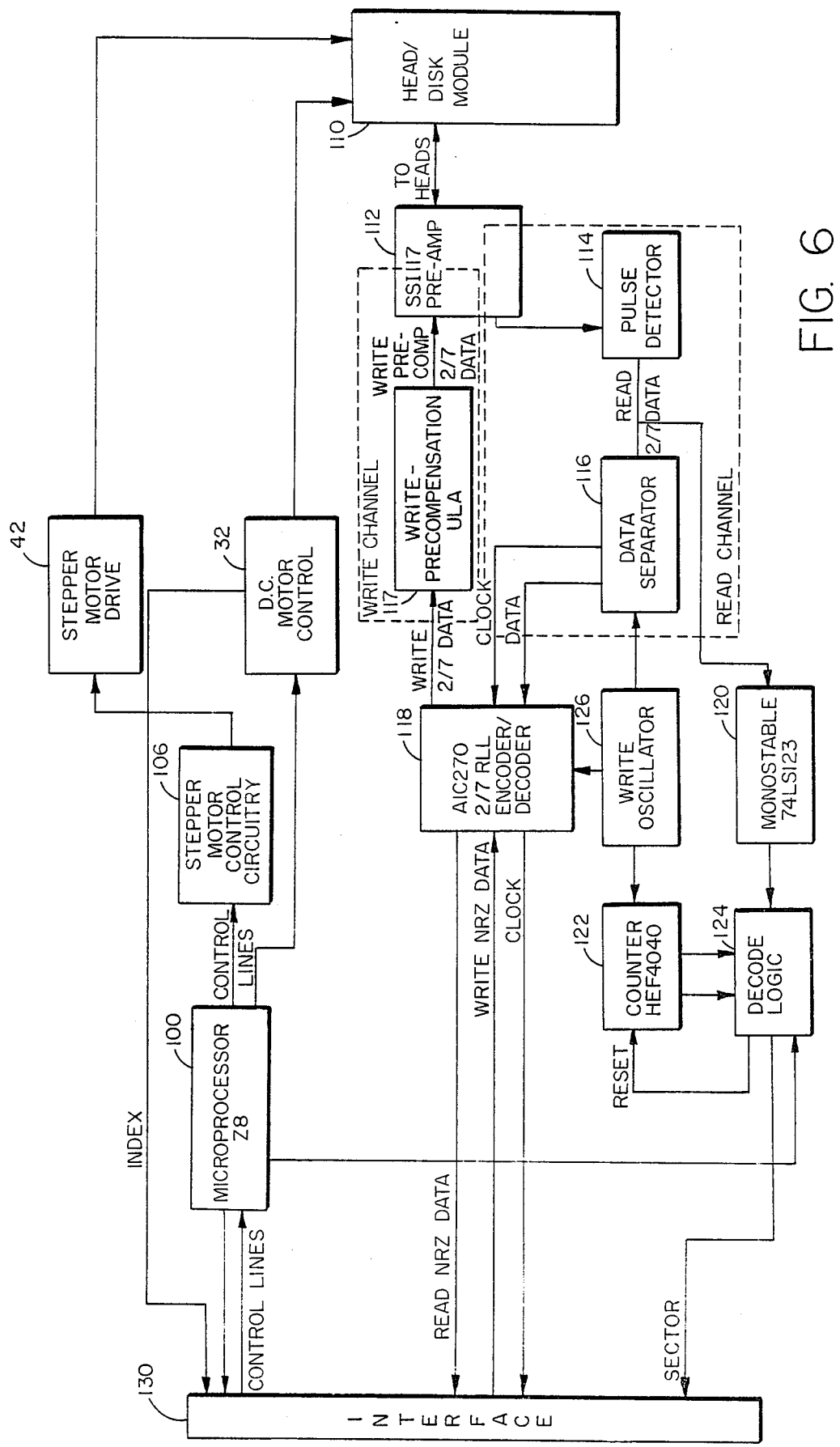
FIG. 6 is a schematic block diagram showing the organization of the electronic control circuit for the hard sectored disk drive system of the present invention.

As shown in FIG. 6, a microprocessor 100 is used to control the actuator functions of the drive. The microprocessor 100 is connected to control both the stepper motor drive 42 and control circuitry 106 and the dc motor control 32, both of which drives are connected in the usual manner to the head/disk module 110. The microprocessor 100 is also connected to an interface 130 which in turn is connected to the host disk controller (not shown).

Data read from the magnetic disks 24 and 26 is preamplified by head preamplifier 112 and fed through disk pulse detector 114 and data separator 116 to encoder/decoder 118. The disk pulse detector 114 amplifies, filters and then differentiates the data signals received from the heads 28 and 30. Its output is a TTL compatible signal which, on the positive leading edge, indicates a signal peak. Electrically, those peaks correspond to the 1's or flux reversals recorded on the disks 24 and 26.

The output of the disk pulse detector 114 is fed to the data separator logic 116. After locking onto the frequency of the input pulses, the data separator 116 separates them into synchronized data and clock signals. The data separator is able to lock onto the receiving preamble data pattern extremely quickly, such that lock indication occurs within four bytes.

The encoder/decoder 118, which receives the output from the data separator 116, is an LSI device which provides an efficient interface between the NRZ data required by the host disk controller and the 2,7 RLL recording code used in the disk drive. That chip may preferably be an AIC-270, manufactured by Adaptec. Such chip performs all of the functions necessary to convert the NRZ data to and from the 2,7 RLL data. It also incorporates address mark generation and detection logic.

The encoder/decoder is connected via a bus to an interface 130 and thence to the host disk controller. The output from the pulse detector 114 is also connected to trigger a retriggerable monostable 120, which may be a 74LS123.

The microprocessor 100 also performs the following functions: all I/O operations, timing operations and communication with the host controller. NRZ data from the host disk controller is connected through the encoder/decoder 118 to a write precompensation circuit 117. That circuit, which may be a semi-custom chip (ULA), model number 5RA097Q1, manufactured by Ferranti Electronics Limited, provides precompensation to the 2,7 RLL encoded data stream prior to its application to the preamplifier 117 and then to the heads 28 and 30.

Figure 8:
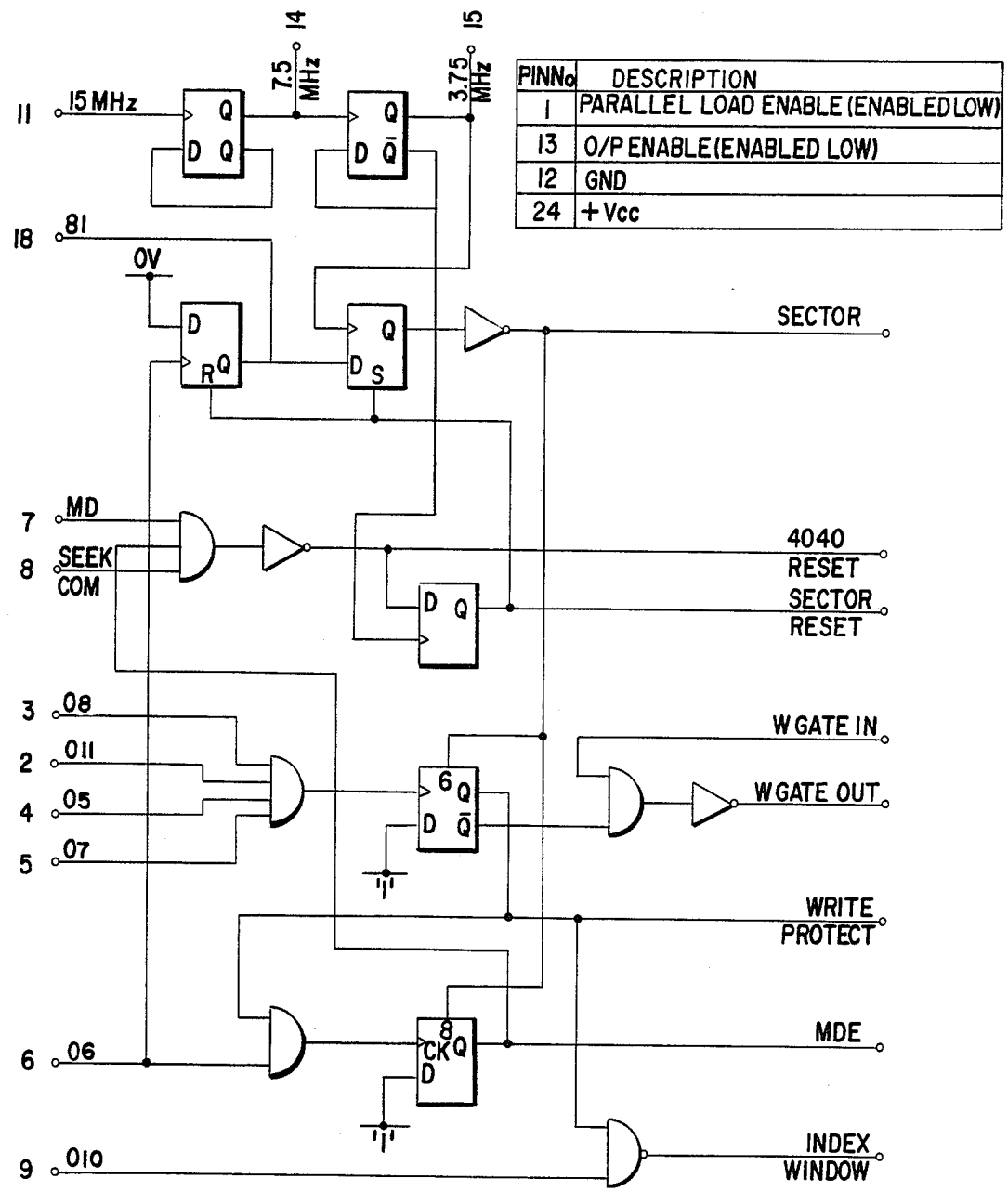
FIG. 8 is a schematic circuit diagram of the decode logic contained in the PAL used by the disk drive system of the present invention.
Figure 9:
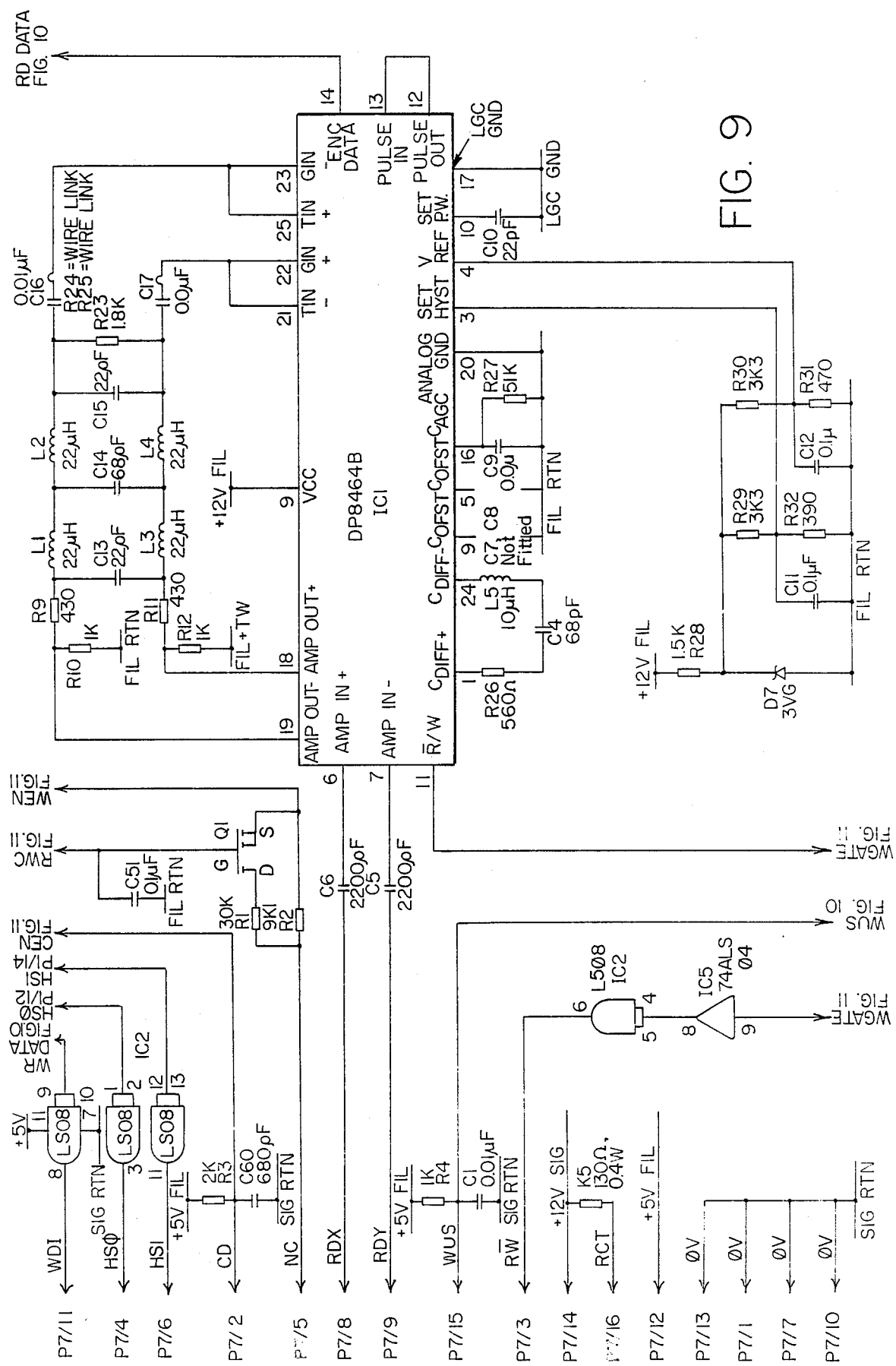
FIGS. 9, 10, 11 and 12 are schematic circuit diagrams of the control circuit for the disk drive system of the present invention.
Figure 10:
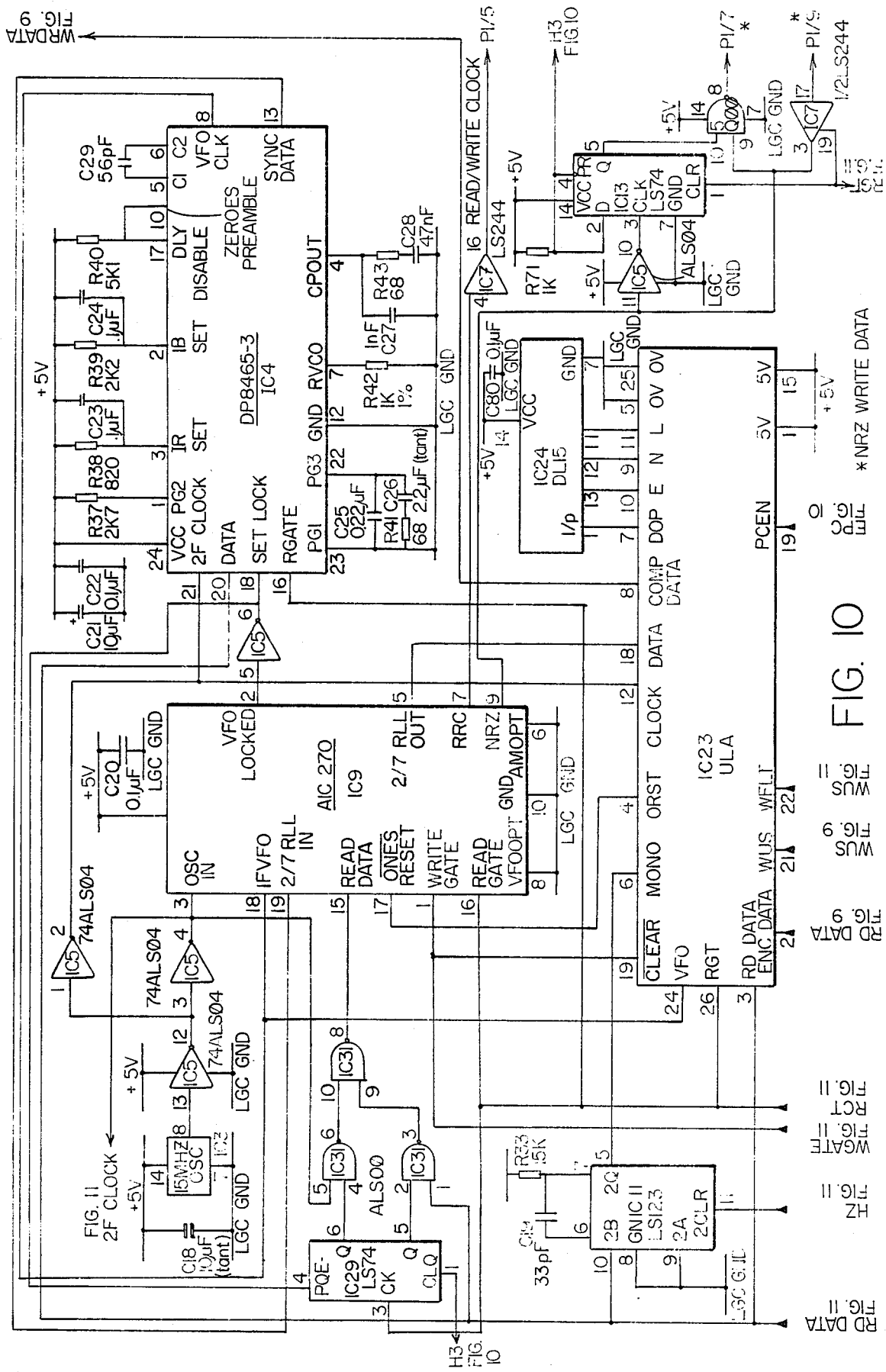
Figure 11:
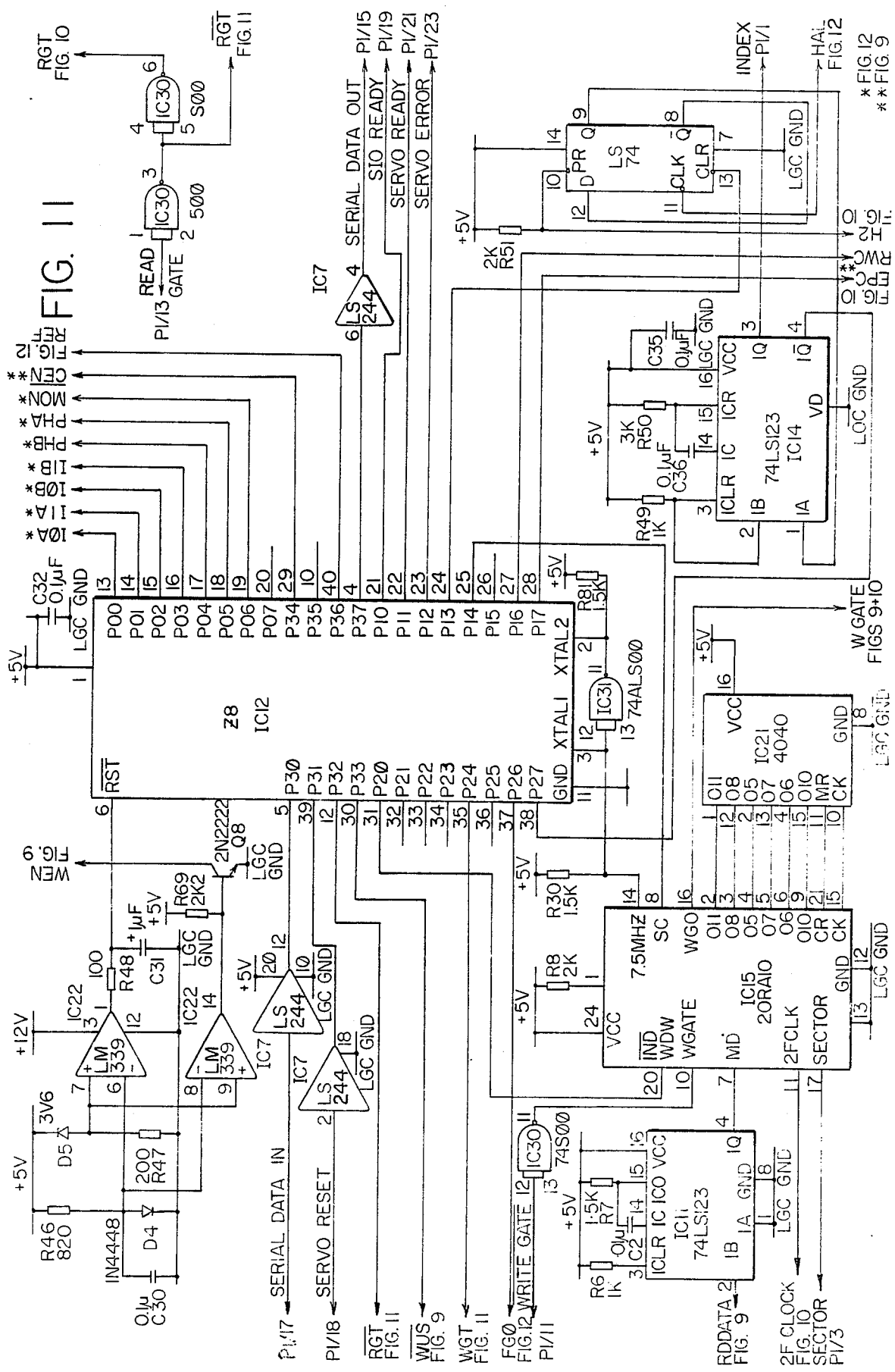
Figure 12:
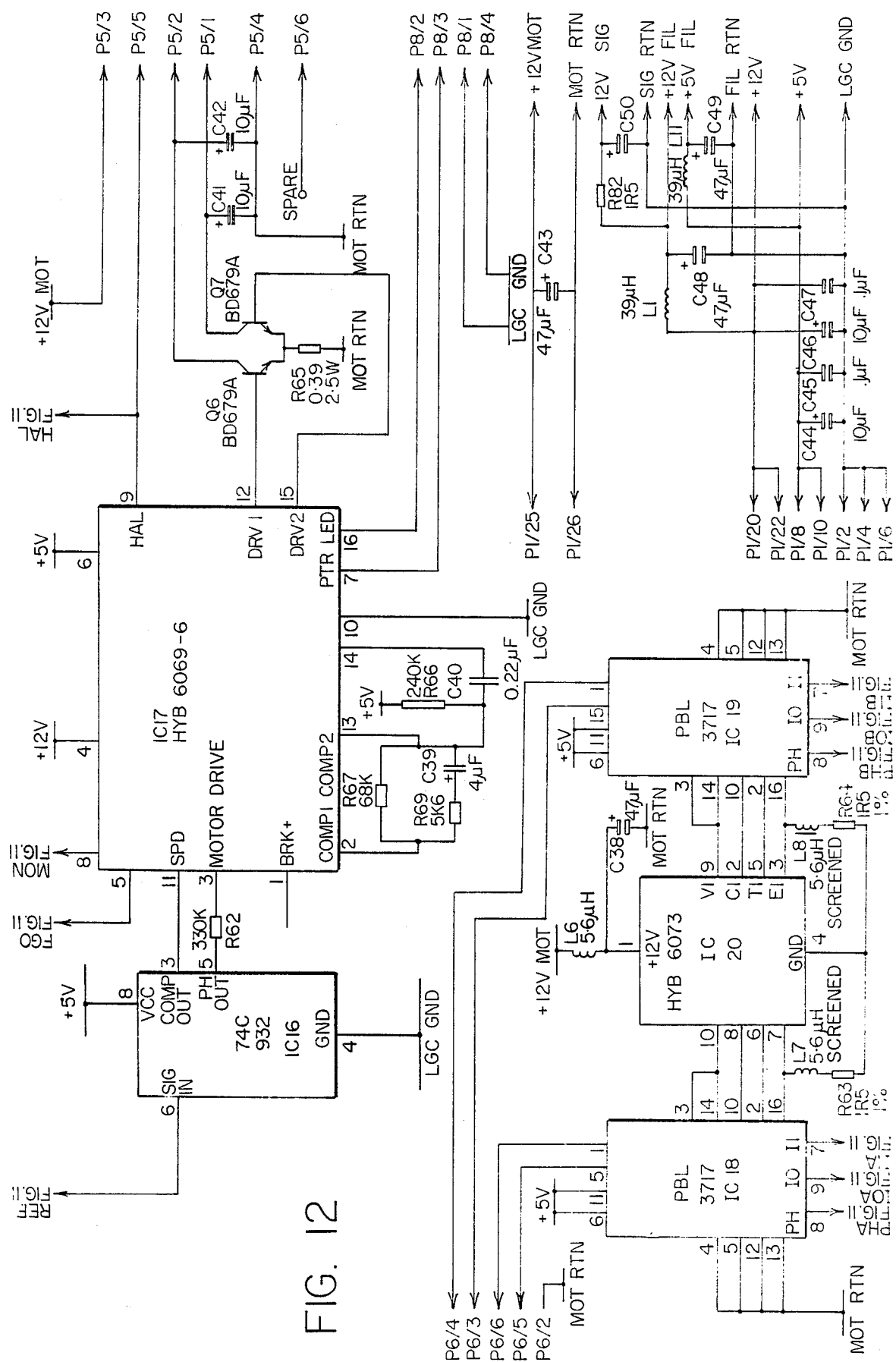

The on-board write oscillator 126 of the disk drive is connected to provide clock signals to the encoder/decoder 118, the data separator 116 and a counter 122. The write oscillator 126 is primarily used to time the read and write functions of the disk drive. The counter 122 counts clock pulses and uses them to define the write protect times. The outputs at the counter 122, which may be an IC no. HEF 4040, are fed to a decode logic 124, which may be a programmed array logic (PAL), model no. MMI 2RA1O, manufactured by Monolithic Memories, Inc. The PAL decode logic 124 contains a plurality of individually accessible registers or flipflops which can be individually clock reset. An electrical schematic diagram of the circuitry contained in the PAL, after it is programmed, is shown in FIG. 8.

The output from the monostable 120 is also connected as an input to the decode logic 124, as is a control line from the microprocessor 100. One output from the decode logic 124, which is a pulse at the beginning of each sector, is fed to the interface 130 and then on to the host disk controller. The decode logic generates a reset signal for the counter 122 as another output.

In operation, the read head senses the beginning of the analog data signal, as shown in FIG. 7A, written on the disk. The output from the read head is pre-amplified and fed to the pulse detector 114, which generates a plurality of digital pulses. The output from the pulse detector 114 is used to trigger monostable 120 which produces a positive or true signal output during the entire time the read head is sensing data on the disk, plus an additional amount, 5 microseconds in the preferred embodiment. The output from the monostable 120, shown in FIG. 7B, is provided to the decode logic 124. The decode logic 124 waits until it next receives a high or true output from the monostable 120, which indicates the beginning of the next sector. It then outputs a sector marker pulse, which is shown in FIG. 7E, to the host disk controller, via the interface 130.

During write sequences, the circuitry operates as follows. Having already read from the disk upon start up, the location of each of the sectors is known. Thus, the decode logic . functions to prevent accidental overwriting of the erased gap contained on each sector. As before, the monostable 120 provides an output signal which goes high at the beginning of each sector and goes low 5 microseconds after the end of the data written on the sector.

The counter 122 is reset by the decode logic 124 upon the monostable 120 going high when sensing the beginning of a sector. It then counts the clock pulses received from the write oscillator 126 and, provides outputs to the decode logic 124 at 660 and 670 microseconds after being reset.

Upon receiving the pulse from the counter 122 660 microseconds after the last sector marker pulse, the decode logic 124 generates a write protect signal (FIG. 7C) which is used to switch-off the write gate of the drive. That is accomplished by providing the inputs of the write gate to the decode logic 124. When the counter 122 inputs a signal 670 microseconds after the last sector pulse, the decode logic generates a missing data enable signal (FIG. 7D) which instructs the decode logic 124 to look for the end of the erased gap, which will occur once the monostable 120 again goes high after timing out.

The circuitry also generates an index reference mark once per revolution of the disk. That is accomplished because the erased gap in one sector is longer than the 10 microseconds gap of all of the other 31 sectors. Thus, the counter 122 runs for a longer period of time after being reset by the decode logic 124 during that one sector. An output signal produced by the counter serves as the index reference mark. That index reference mark is used to choose which index mark generated by the Hall generator becomes the index mark.

Referring now to the circuit diagrams in FIGS. 9-12, there is shown therein IC-12, which is a Z-8 microprocessor used to control all actuator logic functions, I/O operations and communications, as described above. It is connected to the decode -logic 124, which is IC-15, as well as other IC-18 and IC-19, which are used to drive the stepper motor 42 and IC-17, which provides motor control logic for the dc motor 32.

The retriggerable monostable 120 is IC-11 which is connected to IC-15, the decode logic 124 and to IC-1, the pulse detector. IC-21 is the counter 122, which, as previously described, is connected to the decode logic IC-21.

IC-9 is a 2,7 RLL encoder/decoder device. It may preferably be an AIC-270 IC, manufactured by Adaptec. IC-9 performs all of the functions necessary to convert the incoming NRZ coded data to and from the 2,7 RLL data as written to and read from the disks.

The disk pulse detector IC-1 may preferably be a DP8464B integrated circuit. It produces a TTL compatible output which, on the positive leading edge, indicates a signal peak was present at the read/write amplifier inputs to the chip.

The data separator device IC-4, which may preferably be a DP8465 integrated circuit, receives the output from the digital pulse detector circuit IC-1. After locking onto the frequency of those input pulses, it separates them into synchronized data and clock signals. IC-24, which is connected to IC-23, is a delay line with five nanosecond taps. Integrated circuit 23 is a semicustom chip, part number 5RA097Q1, manufactured by Ferranti Electronics Limited, which is used to apply write precompensation to the write data stream. It also provides other peripheral functions.

Integrated circuit 2 is an SN74LS08FN quad NAND circuit. It is used to buffer the data to the head amplifier.

IC-11 and IC-14 are SN74LS123FN dual retriggerable monostables. One of those monostables is used to provide the index pulse and the other is part of the sync field detection logic.

IC-18 and IC-19 are PBL3717 RIFA devices. They are used to drive the stepper motor 42.

IC-20 is connected to both of the stepper motor driver chips IC-18 and IC-19 and is a custom hybrid chip which provides filtering for those chips.

IC-17 is a custom hybrid device which provides motor control logic for the dc motor 32.

IC-22 is an LM 339 quad comparator device. It is used to monitor the power supplies and to provide protection against the corruption of data on power-up of the disk drive of the present invention.

The concept of RLL codes is believed to be well known. Such codes, in the disk drive arena, serve such purposes as furnishing adequate clocking information in the read-back signal; minimizing flux reversal density for a given bit density; allowing an adequate clocking window for the reliable timing of the read-back data; and provide the capability of being encoded and decoded reliably and economically.

The normal code designation for RLL code is (D,K), where D is the minimum number of consecutive zeros and K is the maximum number of consecutive zeros. The full designation of the RLL code is (D,K; M,N; R); where D and K have the meaning set forth above and M is equal to the minimum number of data bits to be encoded, N is equal to the number of code bits for each M data bits and R is equal to the number of different word lengths in a variable word length code.

The density ratio DR or data bits per flux reversal is equal to (D+1) which is equal to bits per inch divided by the flux changes per inch. The frequency ratio FR, or the ratio of maximum to minimum time between transitions is equal to K+1/D+1 which, when using 2,7 coding, is equal to 8/3.

A code conversion table for 2,7 code is as follows:

| Original or Decoded Words | Encoded Words |
| --- | --- |
| 11XX | 0100XXXX |
| 10XX | 1000XXXX |
| 011X | 000100XX |
| 010X | 001000XX |
| 000X | 100100XX |
| 0011 | 00100100 |
| 0010 | 00001000 | where X may be either a 1 or a zero and (D,K: M,N; R) equals (2,7: 2,4; 3).

Although only a preferred embodiment is specifically illustrated and described herein, it will be appreciated that many modifications and variations of the present invention are possible in light of the above teachings and within the purview of the appended claims without departing from the spirit and intended scope of the invention.

WHAT IS CLAIMED IS:

1. A method of generating hard sector marker pulses for use in conjunction with a micro-hard disk drive system, comprising the steps of;
    pre-initializing each concentric track on at least one hard-disk with a plurality of data signals separated by erased gaps;
    reading said plurality of data signals and erased gaps using the read/write head of said disk drive;
    converting said read plurality of data signals to digital pulses;
    triggering a monostable using said digital pulses in order to provide an output signal during the time said read/write head senses the presence of said data signals; and
    generating a sector marker pulse upon again receiving an output signal from said monostable after it has ceased to produce an output signal for a predetermined time.

2. The method of claim 1, wherein said plurality of data signals and erased gaps are equal in number.

3. The method of claim 1, wherein said plurality of data signals and erased gaps are equal to the number of sectors contained on each track.

4. The method of claim 1, wherein one of said plurality of erased gaps is of a longer duration than the rest of the plurality of erased gaps.

5. The method of claim 1, wherein each of said plurality of data signals occurs for a longer time period than each of said plurality of erased gaps.

6. The method of claim 1, wherein said monostable times out a predetermined time after it ceases receiving said digital pulses.

7. The method of claim 6, wherein said predetermined time is less than the duration of one of said plurality of erased gaps.

8. The method of claim 4, further including the step of generating an index pulse upon the retriggering of said monostable after it has ceased to produce an output signal for a period of time corresponding to said longer duration erased gap.

9. The method of claim 1, further including the steps of:
generating a plurality of clock pulses;
counting said plurality of clock pulses starting from the generation of said sector marker pulse;
producing a first clock signal a predetermined time after the generation of said sector marker pulse; and
generating a write protect signal upon the production of said first clock signal such that the next erased gap is prevented from being overwritten.

10. The method of claim 9, wherein said write protect signal serves to prevent the read/write head from writing data on said hard disk until the generation of the next sector marker pulse.

11. The method of claim 1, further including the step of writing data on said hard disk in accordance with the location of said pre-initialized data signals.

12. The method of claim 9, further including the steps of:
producing a second clock signal a second predetermined time after the generation of said sector marker pulse; and
generating a missing data enable signal upon the production of said second clock signal such that said step of generating said sector marker pulse occurs only after the generation of said missing data enable signal.

13. The method of claim 12, wherein said first clock signal is produced a predetermined time before said second clock signal.

14. The method of claim 12, wherein said first and second clock signals are terminated upon the generation of a sector marker pulse.

15. Apparatus for generating hard sector pulses for use in conjunction with a micro-hard disk drive system, comprising:
at least one micro-hard disk having a plurality of concentric tracks, each of said concentric tracks having a plurality of data signals of predetermined duration separated by a like plurality of erased gaps;
transducer means for reading information from and writing information to said hard disk;
converter means connected to said transducer means for converting said plurality of data signals to a plurality of digital pulses;
switching means connected to said converter means for producing an output signal during at least the time said transducer means is reading each of said plurality of data signals; and
decoding means for generating a sector marker pulse upon again receiving an output signal from said switching means after said switching means has ceased to produce an output signal for a predetermined time period.

16. The apparatus of claim 15, wherein said plurality of data signals and erased gaps are equal to the number of sectors contained on each track.

17. The apparatus of claim 15, wherein said plurality of erased gaps are of equal time duration.

18. The apparatus of claim 15, wherein one of said plurality of erased gaps is of a predetermined longer time duration that the rest of the plurality of erased gaps.

19. The apparatus of claim 15, wherein each of said plurality of data signals is of a longer time duration than each of said plurality of erased gaps.

20. The apparatus of claim 15, wherein said switching means switches off a predetermined time after it ceases receiving said digital pulses.

21. The apparatus of claim 20, wherein said predetermined time after which said switching means switches off is less than the duration of one of said plurality of erased gaps.

22. The apparatus of claim 18, wherein said decoding means generates an index pulse upon again receiving an output signal from said switching means after said switching means has ceased to produce an output signal for said predetermined longer time duration.

23. The apparatus of claim 15, further comprising:
means for generating a plurality of clock pulses;
counter means counting said plurality of clock pulses beginning from the generation of said sector marker pulses and for producing a first clock signal a predetermined time after the generation of said sector marker pulse; and
said decoding means receives said first clock signal and generates a write protect signal such that the next erased gap is prevented from being overwritten.

24. The apparatus of claim 23, wherein said write protect signal serves to protect said transducer from writing data on said hard disk until the generation of the next sector marker pulse.

25. The apparatus of claim 23, further comprising:
said counter means producing a second clock signal a second predetermined time after the generation of said sector marker pulse; and
said decoding means generates a missing data enable signal upon receiving said second clock signal such that said generation of said sector marker pulse occurs only after the generation of said missing data signal.

26. The apparatus of claim 25, wherein said first clock signal is produced a predetermined time before said second clock signal.

27. The apparatus of claim 25, wherein said counter means is reset upon the generation of said sector marker pulse by said decoding means.

28. The apparatus of claim 15, wherein said switching means comprises a retriggerable monostable device.

29. The apparatus of claim 15, wherein said converter means comprises a pulse detector integral to said hard disk drive system.

30. The apparatus of claim 25, wherein said means for generating a plurality of clock pulses comprises a write oscillator integral to said hard disk drive system.

31. A high capacity disk drive system for operating a hard sectored micro-hard disk, said disk drive comprising:
at least one micro-hard disk having a plurality of concentric tracks each of said concentric tracks having a plurality of data signals of like predetermined duration separated by a like plurality of erased gaps;
means for rotatably supporting said micro-hard disk;
means for rotating said micro-hard disk;
transducer means for writing digital information on and reading digital information from said micro-hard disk in 2,7 RLL coding format so that said at least one micro-hard disk has at least 10 MB of formatted digital information stored thereon;

positioning means for moving said transducer means between the tracks on said micro-hard disk;

converter means connected to said transducer means for converting said plurality of data signals to a plurality of digital pulses;

switching means connected to said converter means for producing an output signal during at least the time said transducer means is reading each of said plurality of data signals; and decoding means for generating a sector marker pulse upon again receiving an output signal from said switching means after said switching means has ceased to produce an output signal for a predetermined time period.

32. The disk drive system of claim 31, wherein said means for rotating said micro-hard disk rotates said micro-hard disk at 2750+10% and −5% r.p.m.

* * * * *

UNITED STATES PATENT AND TRADEMARK OFFICE
CERTIFICATE OF CORRECTION

PATENT NO. : 4,757,406
DATED : July 12, 1988
INVENTOR(S) : Alec D. Stewart et al.

It is certified that error appears in the above-identified patent and that said Letters Patent is hereby corrected as shown below:

| Column | Line | |
|---|---|---|
| 4 | 39 | Please delete "Lrmited" and insert --Limited--. |
| 4 | 50 | Please delete ", or and" and insert --, portable or otherwise, and-- |
| 10 | 43 | Please delete "7B" and insert --78--. |
| 10 | 64 | Please delete "head on average" and insert --head, on average,-- |
| 12 | 25 | Please delete "anded" and insert --ANDED--. |
| 14 | 37 | Please delete "logic .functions" and insert --logic functions--. |
| 15 | 7 | Please delete "decode -logic" and insert --decode logic--. |

Signed and Sealed this

Twentieth Day of December, 1988

*Attest:*

DONALD J. QUIGG

*Attesting Officer*        *Commissioner of Patents and Trademarks*